United States Patent [19]

Gjertsen et al.

[11] Patent Number: 4,783,312

[45] Date of Patent: Nov. 8, 1988

[54] RADIAL NEUTRON REFELECTOR

[75] Inventors: Robert K. Gjertsen, Monroeville Boro; John F. Wilson, Murrysville Boro, both of Pa.

[73] Assignee: Westinghouse Electric Corp., Pittsburgh, Pa.

[21] Appl. No.: 894,095

[22] Filed: Aug. 8, 1986

Related U.S. Application Data

[63] Continuation of Ser. No. 634,337, Jul. 25, 1984, abandoned.

[51] Int. Cl.⁴ ............................................. G21C 11/06
[52] U.S. Cl. ..................................................... 376/458
[58] Field of Search ............... 376/458, 459, 426, 429, 376/427

[56] References Cited

U.S. PATENT DOCUMENTS

| | | | |
|---|---|---|---|
| 3,102,080 | 8/1963 | Mission et al. | 204/193 |
| 3,128,234 | 4/1964 | Cage, Jr. et al. | 376/458 X |
| 3,192,621 | 7/1965 | Bauer et al. | 376/426 X |
| 3,219,540 | 11/1965 | Costes | 176/42 |
| 3,248,299 | 4/1966 | Junkerman et al. | 176/85 |
| 3,371,016 | 2/1968 | Tower et al. | 176/53 |
| 4,146,431 | 3/1979 | Tarasuk et al. | 176/82 |

FOREIGN PATENT DOCUMENTS 2835419 2/1980 Fed. Rep. of Germany .

Primary Examiner—John F. Terapane
Assistant Examiner—John S. Maples

[57] ABSTRACT

A radial neutron reflector for a water moderated nuclear reactor. The space surrounding the nuclear core is provided with a plurality of side-by-side stacked reflector roads having a square cross-sectional shape. Blocks of reflector material having axial grooves are fitted within a square enclosure. The assembly is subjected to high pressures and temperatures which collapse the enclosure onto the blocks eliminating the assembly clearance. The enclosure material flows into the grooves of the blocks leaving wrinkle-free surfaces over the flat remainder of the enclosure. Square shaped reflector rods result in high solid-to-void ratios in the radial reflector region of the reactor. The resulting grooves allow for coolant flow and cooling of the rods.

7 Claims, 2 Drawing Sheets

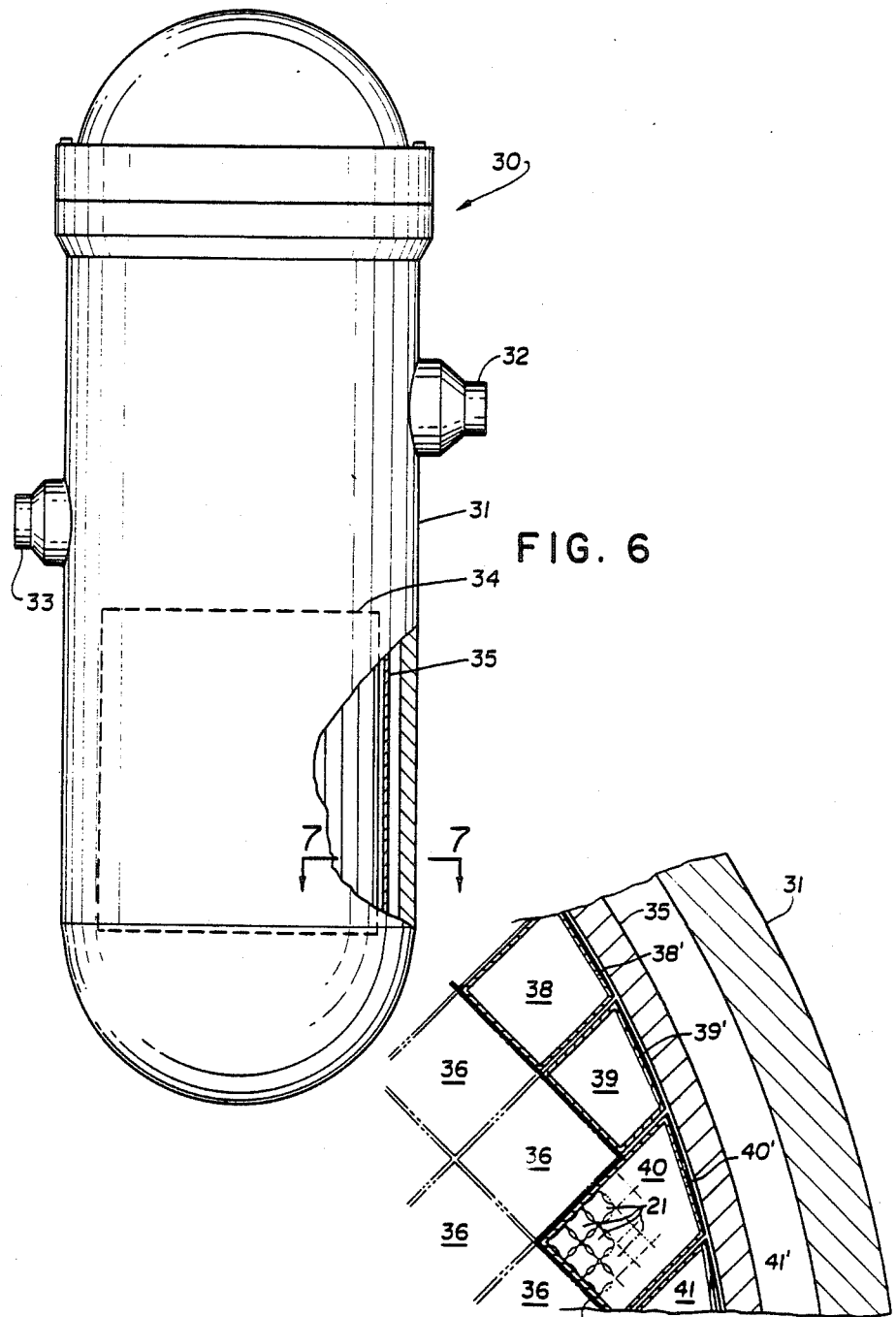

RADIAL NEUTRON REFELECTOR

This application is a continuation of application Ser. No. 634,337, filed July 25, 1984.

BACKGROUND OF THE INVENTION

1. Field of the Invention

This invention relates in general to the field of pressurized light water nuclear reactors and in particular to the radial neutron reflector surrounding the nuclear core for improved neutron economy.

2. Description of the Prior Art

It is well known that commerical, pressurized light water, nuclear reactors are both a technical and commercial success. In such reactors, a reactive region commonly referred to as a nuclear core contains nuclear fuels such as uranium 235, as well as other fissile materials, which undergo sustained fission reactions and in so doing, generate heat. There are, of course, other materials in the nuclear core, the presence of such other materials, however, is not germane to this invention and, accordingly, will not be discussed. A group of mechanical components, which are known as reactor internals, structurally support the core within a hermetically sealed pressure vessel. The reactor internals also direct the flow of a cooling medium, such as light water, into the pressure vessel through the nuclear core, and out of the pressure vessel. The cooling medium which is alternatively called the reactor coolant, removes the heat generated by the fissioning of the nuclear fuel and transfers the heat to another cooling medium within heat exchangers which are located external of the pressure vessel. The second cooling medium, which also is usually water, is converted into steam in the heat exchangers and is thereafter used to produce electricity by conventional steam turbine-electrical generator combinations.

The reactor internals usually include a core barrel comprising an elongated cylinder which is interposed between the nuclear core and the cylindrical wall of the pressure vessel. The nuclear core then is positioned within the core barrel. Typically, the reactor coolant enters the pressure vessel through one or more inlet nozzles, flows downward between the pressure vessel and the outside of the core barrel, turns 180°, and flows upward through the core and through the space between the outside of the core and the inside of the core barrel. The heated reactor coolant then turns 90° and exits the pressure vessel through one or more exit nozzles and then to the heat exchangers previously mentioned.

In the pressurized water reactors, such as the one described, the fissioning of the nuclear fuel results from the capture of a neutron by the nucleus of the atoms of the nuclear fuel. It is well known that each neutron producing a fission causes heat and the production of more than one other neutron (on the average, 2.1 neutrons are released per capture). To sustain the nuclear chain reaction, at least one of the newly produced neutrons must then fission another atom of fuel. Since the neutrons generated are fast neutrons, and fissioning is enhanced by slow neutrons, it is advantageous that the fast neutrons be slowed down or thermalized within the confines of the nuclear core. The reactor coolant comprising light water is an excellent moderator of neutrons; hence, in reactors primarily using U-235 as the nuclear fuel, it is the primary means by which the fast neutrons produced by the fission process are thermalized or slowed down so as to increase the probability that another fission may occur and thereby sustain the chain reaction. The excess neutrons are accounted for in a number of different ways. Some are absorbed by the reactor internals. Others are slowed down and absorbed by a nuclear poison such as boron which is dissolved in the primary coolant. Other neutrons are absorbed by load follow control rods containing nonburnable control poisons which control rods comprise the means for controlling the nuclear reactor. Others are absorbed by special control rods which are interspersed throughout the nuclear core and made of materials specifically selected to absorb neutrons such as burnable poisons which as their name implies are burned during reactor operation and, therefore, become less effective in proportion to the continually reducing reactivity of the nuclear core. Still other neutrons are absorbed by poisons which build up within the nuclear fuel and are caused by the fission process itself. Quite obviously, the accounting for the excess neutrons is a complicated matter which can, however, be summarized by stating that some excess neutrons are purposefully absorbed while the remainder are inadvertently absorbed. And, it is desirable to reduce the number that are inadvertently absorbed.

In order to extend the life of the nuclear core as long as is practical so as to minimmize time consuming reactor shutdowns for refueling purposes, the fuel assemblies are provided with enriched nuclear fuel, usually enriched uranium 235. This excessive amount of reactivity is designed into the core at startup so that as the reactivity is deleted over the life of the core, the excess reactivity is then used, thereby extending the life of the core. The amount of enrichment continuously decreases as the reactor operates until such time as the core can no longer sustain the chain reaction. Then the reactor must be shut down and refueled. During the initial stages of reactor operation or during the phase which is known as beginning of life, special neutron absorbing control rods may be inserted within the core and/or additional soluble poisons are dissolved within the reactor coolant and/or burnable poisons may be included within the fuel assemblies to absorb the excess reactivity. As the excess reactivity decreases due to the nuclear fuel being burned, the amount of insertion of the special control rods and/or the amount of soluble poison and/or the burnable poisons within the special control rods and/or the fuel assemblies are consumed consistent with the reduction in excess reactivity to maintain the chain reaction. In this manner, the excess reactivity is held in abeyance until it is needed.

Enriched uranium is extremely expensive. It is preferably, therefore, to reduce the amount of enrichment whenever possible but without reducing the extended operating length of the life of the core. One recognized method or theory to accomplish this result is by making more efficient use of the neutrons produced by the fission process. An area where present day nuclear reactors are relatively inefficient, as regards neutron economy is concerned is, in general, the region of the reactor between the pressure vessel and the nuclear core, and in particular between the internal diameter of the core barrel and the outer periphery of the fuel assemblies. Since the fuel assemblies are square in cross section, side-by-side stacking of the fuel assemblies produces an irregular non-circular outer periphery of the core. In the prior art, stainless steel vertical plates are positioned against the irregular periphery of the core. The vertical plates are supported by a plurality of horizontal "former plates" bolted to the vertical reflector plates. The former plates are in turn bolted to the core barrel.

The former plates are specially shaped to provide for the transition from the irregular core periphery to the circular shape of the core barrel. The vertical plates provide for core lateral support and prevent the reactor coolant from bypassing the core. Although not necessarily originally intended, it has been determined that the vertical stainless steel plates also provide a radial neutron reflection function. In this manner, means have been provided whereby some of the excess neutrons produced by the fission process and some of which would otherwise radially escape from the core are reflected by the stainless steel plates back into the core. Unfortunately, the present day design of the stainless steel plates as regards the radial reflector function is not as efficient as desired. For example, the space between the vertical stainless steel and the horizontal former plates is occupied by primary coolant which allows for removal of the heat absorbed by the core barrel, the former plates and the vertical plates. While water is an excellent moderator it is an inefficient reflector. Thus, while some neutrons are reflected back into the core, a great number are thermalized and/or absorbed by the relatively large volume of reactor coolant located radially external of the nuclear core.

Patent Application Ser. No. 576,655 entitled "Radial Neutron Reflector" filed Feb. 3, 1984 by Freeman, et al., and assigned to Westinghouse Electric Corporation, disclosed means to overcome the problems of the reflector region of the prior art. In that patent application, the space between the core periphery and the core barrel is divided into a number of different shapes which are filled with solid stainless steel plates or within which are placed either a plurality of elongated circular metal rods or blocks of metal stacked on top of each other. Reactor coolant flows between the circular rods or through special holes in the stacked blocks or solid steel plates in order to cool the material surrounding the core which is intended to act as a neutron reflector. By substantially removing the water from the reflector region and replacing it with a material other than hydrogen, the prior art problem of loss or absorption of the radially escaping neutrons was overcome. The radially escaping neutrons are bounced or reflected back into the reactive core region where they may be effectively and advantageously used. While the noted pending patent application comprises a substantial contribution toward effective management of radially escaping neutrons, there is the desirability of improving upon this contribution. Accordingly, a major object of the present invention is to provide apparatus designed to be used in the reflector region of a nuclear reactor which improves upon the type of reflector disclosed in the referenced patent application.

In filling the space between an irregular core periphery and a circular barrel surrounding the core, it is difficult if not impossible to utilize a single standard shape and provide uniform cooling. An irregularly shaped annulus inherently requires a number of specially fitted shapes to fill the myriad of oddly angled corners and spaces left over from stacking of the regular shapes. Cooling of the irregular and the regular shapes is important to prevent thermal bowing and excessive thermal stresses. Proper cooling requires properly sized coolant holes and coolant channels between the shapes. Cooling of both the regular and the irregular shapes is, however, problematic because of the equally irregular shape of the interstitial spaces between the shapes, which are due primarily to the fitup of the shapes. Too large of a space causes overcooling; while too small of a space results in overheating and perhaps failure. Providing properly sized coolant holes or channels in the regularly shaped reflector pieces is a problem because, in part, of the nature of the most effective reflector material—zirconia. Zirconia cannot be directly exposed to the reactor coolant and must be clad or covered with a protective material such as stainless steel or zircaloy. Hence, the cooling holes must be internally fitted with tubes of such protective materials. However, in using internal cladding, fitup problems and differential thermal expansion problems usually arise. External cladding of the zirconia shapes is problematic for these same reasons. In order to fit the blocks of the zirconia into the external cladding, a clearance space must necessarily exist between the outer dimensions of the blocks and the inner diameter of the cladding. After assembly, the clearance space still exists. Pressure within the reactor vessel during reactor operation subsequently causes the cladding to collapse onto the blocks (the cladding prevents pressure equalization) and in so doing a number of wrinkles undesirably appear in random locations. These wrinkles interfere with the carefully designed cooling flow between the shapes resulting in the aforementioned problems.

Accordingly, another object of the present invention is to provide apparatus for use as a radial neutron reflector which allows side-by-side stacking of clad shapes with substantially no gap between adjacent shapes.

Another object of the present invention is to provide clad reflector elements which allow side-by-side stacking and have no clearance between the inner reflector material and the outer cladding.

Another object of the present invention is to provide clad reflector elements which have a wrinkle-free clad surface.

Another object of the present invention is to provide clad reflector elements which have accurately sized and positioned coolant flow passages.

Another object of the present invention is to provide clad reflector elements which have a high solid-to-void ratio when stacked together in the reflector region of the core.

Other objects resulting from the present invention, although not specifically listed, are intended to be within the scope of the present invention. Accordingly, the above-stated objects are not intended to be a complete listing of all the objects or disadvantages of the present invention.

SUMMARY OF THE INVENTION

The above objects as well as others are achieved by the present invention which provides an improved radial reflector arrangement.

Essentially square, in cross-sectional shape, blocks of reflector material such as zirconia are stacked one on top of each other within a square stainless steel, zircaloy or other appropriate cladding tube. Assembly clearance is provided between the other dimensions of the blocks and the inner dimensions of the tubes. The blocks of reflector material are provided with axial grooves in the sides of the blocks. End plugs are seal welded to the square tubing when the tubing is completely filled with the reflector material blocks. The assembly is then subjected to reactor pressures and temperatures which causes the cladding to collapse onto the stacked blocks. The excess cladding is thus forced into the axial grooves in the blocks, leaving a completely flat, wrinkle-free clad surface on the flat surfaces of the blocks.

The filled tubes may then be assembled within an appropriate enclosure located at the periphery of the core. The square, wrinkle-free shape of the filled tubes allow for tight, side-by-side stacking, thereby eliminating any interstitial gaps between the stacked shapes. The axial grooves provide for cooling by functioning as reactor coolant flow channels.

BRIEF DESCRIPTION OF THE DRAWINGS

Various other objects, advantages and features of the invention will become apparent to those skilled in the art from the following discussion taken in consideration with the following drawings, in which:

FIG. 6 is a view of a typical nuclear reactor to which the present invention may be applied; and FIG. 7 is a view taken along the line 7—7 of FIG. 6.

DESCRIPTION OF THE PREFERRED EMBODIMENTS

Figure 1:
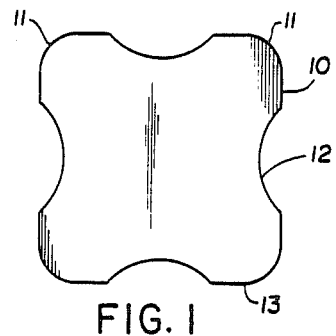
FIG. 1 is a plan view of a grooved block of reflector material made in accordance with the present invention.
Figure 2:
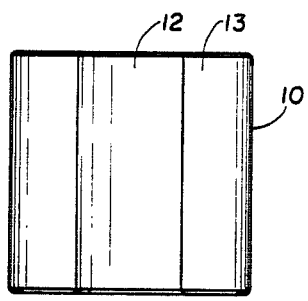
FIG. 2 is an elevational view of the block of FIG. 1.

Referring now to the drawings, where like characteristics are referred to by the same numerals among the various figures, FIGS. 1 and 2 illustrate one form of a pellet or block 10 of reflector material made in accordance with the invention. Block 10 has a substantially square cross-sectional shape. Each of the four corners 11 is rounded for purposes which will be more fully understood as explained hereinafter. The cross-sectional dimensions of block 10 are not critical to the operation of the invention. Neither is the height of individual blocks 10 critical to the operation of the invention.

In the illustrated embodiment, a shallow groove 12 is provided in each of the sides 13 of block 10. Grooves 12 extend axially along the length of block 10 at substantially the middle of each side. Although only one groove 12 is shown in each side, the invention contemplates the use of one or more of such grooves in each side, as well as offset grooves. That is, grooves which are offset relative to the middle of the side of the blocks. The number of grooves selected and their location are dependent, in part, upon the depth of the grooves, the width of each face 13, the amount of cooling desired, the actual in-core location of the particular reflector rod using the blocks 10 as well as other hydraulic, thermal, neutronic, pressure, and stress considerations.

Figure 3:
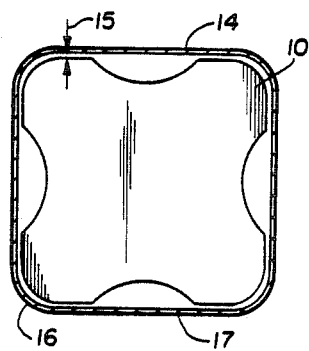
FIG. 3 is a plan view of a block of reflector material fitted within square cladding tubing at initial assembly.
Figure 4:
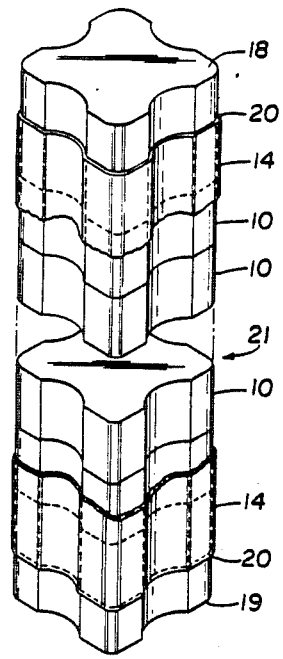
FIG. 4 is an isometric view, partially in cross section, of a stacked column of reflector blocks fitted within square cladding tubing which is collapsed onto the reflector block.

Zirconia is probably the most efficient nuclear reflector material available for use as a radial neutron reflector. Its characteristics, however, prevent direct exposure to the water reactor coolant. Thus, in order to use zirconia, it must be fully protected from the reactor coolant. Traditionally, stainless steel and/or zircaloy cladding has been used for this purpose. Stainless steel is also a good neutron reflector, and even though it is not quite as efficient as zirconia, it may be used with good results. In FIG. 3, a square can or tubing 14 is shown as being used to clad the zirconia blocks 10. A clearance space 15 is provided between the outside of block 10 and the inside of can 14. Clearance space 15 is used for assembly purposes. It allows blocks 10 to be inserted and stacked in a long length of tubing 14. The corners 16 of tubing 14 are rounded consistent with the rounded corners of blocks 10, having substantially the same radius of curvature. It is to be noted that the sides 17 of tubing 14 are flat, i.e., they are not grooved when blocks 10 are initially fitted within tubing 14.

End plugs 18 and 19 are consistent in size and shape with blocks 10 and are welded 20 to tubing 14 at each end thereof. Weld 20 is a seal weld. Axial compressive forces are applied to each end plug 18 and 19 during welding so that any assembly gaps between the stacked blocks 10 are eliminated. The overall length of reflector rod 21 is consistent with the overall length of the nuclear core in which the reflector rods 21 will be employed.

Each assembled reflector rod 21 is exposed in, for example, an autoclave, to approximately the maximum expected pressure and temperature which they will experience in the actual reactor environment before they are stacked or assembled in the reactor. The autoclave pressure and temperature will cause the cladding 14 to collapse onto blocks 10. The excess cladding material flows into the grooves 12 in blocks 10 forming grooves 22 in the reflector rods 21. Additionally, the clearance assembly space 15 is completely eliminated causing the cladding 14 to fit snugly against each of the blocks 10. The resulting cross-sectional configuration of each of the reflector rods 21 is as shown in FIG. 5.

Laboratory testing has verified the collapsing of type 304 stainless steel cladding having a nominal thickness of approximately 0.051 cm onto simulated blocks of 2.54 cm square zirconia. An assembly clearance of 0.025 to 0.038 cm was used for the tests. Each block had a single groove in each side having a radius of approximately 0.737 cm by 0.203 cm deep. An autoclave temperature of approximately 633° K. and a pressure of approximately 190 kg/cm$^2$ was used. The assembly gap was completely eliminated, the sides of the tubing were wrinkle free and well defined grooves were formed in the tubing. The radius of curvature of the cladding substantially coincided with and formed around the radius of curvature of the corners 16 of the blocks 10. The tests unequivocally proved the manufacturability of the invention. Should it be desired to deviate from the sizes, dimensions and number of groove as stated above, by a similar test, utilizing methods well known in the art, it is possible to establish suitable dimensions of the clad thickness and the assembly clearance.

Figure 5:
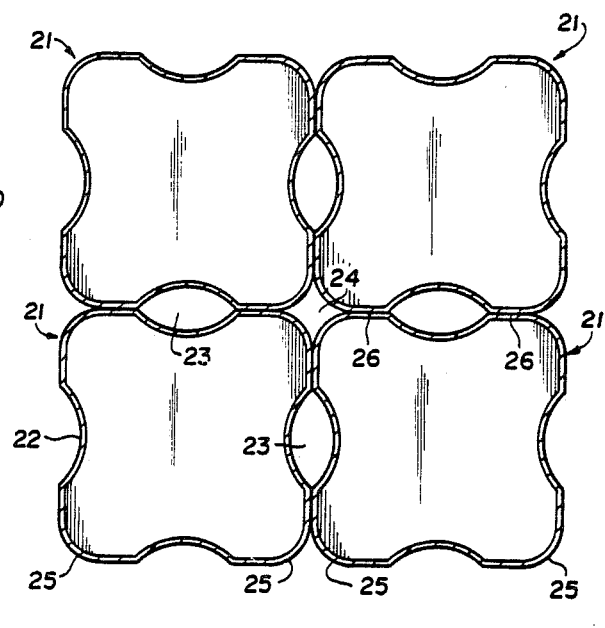
FIG. 5 is a plan view of a side-by-side stacked array of a number of reflector rods.

FIG. 5 illustrates the axial cooling channels formed by the side-by-side stacking of square reflector rods 21 with non-offset grooves 22. Channels 23 are formed by mating adjacent grooves 22; and, channels 24 are formed by the intersection of the rounded corners 25. The square arrangement allows for virtually no interstitial gaps between the flat mating surfaces 26 of the reflector rods 21. With the use of offset grooves in both blocks 10 and the cladding 14, the side-by-side stacking of reflector rods provides at least two cooling channels between abutting sides of the reflector rods 21. In this manner, the coolant flow cross-sectional area may be spread out across the sides of the reflector rods 21.

Other variations in the location and number of grooves 22 may be readily envisioned to result in other differing configurations of cooling flow channels.

A typical reactor 30 to which the present invention may be applied is shown in FIG. 6. Reactor 30 includes a pressure vessel 31 having a one or more reactor coolant inlet 32 and outlet 33 nozzles. A nuclear core 34 is positioned within pressure vessel 31. A core barrel 35 comprising a cylindrical structural member which functions as a reactor coolant flow separator is located between the nuclear core 34 and pressure vessel 31. The reactor coolant enters inlet nozzle 32, flows down and around the outside of core barrel 35, turns 180° and then flows up through core 34 and the inside of core barrel 35 and exits from the reactor 30 through outlet nozzle 33.

FIG. 7 shows a portion of the core periphery in cross section as might be taken along a line 7—7 of FIG. 6. A plurality of substantially square in cross section fuel assemblies 36 are stacked side-by-side resulting in an irregular core periphery designated by darkened line 37. The space between the irregular core periphery 37 and core barrel 35 is filled with reflector rods 21. For purposes of simplicity, reflector rods 21 are not shown in spaces 38, 39 and 41, which define, in part, the space between the core 34 and core barrel 35. For purposes of simplicity, space 40 is shown only partially filled with reflector rods 21. Spaces 38 through 41 may be fitted with hollow housings or enclosures 38', 39', 40', and 41' which substantially fill said spaces. The reflector rods 21 may then be fitted within said enclosures 38' through 41' and may be stacked as shown in FIG. 5. Any odd space remaining after fitting rods 21 may be left unoccupied for purposes of coolant flow or fitted with appropriately shaped reflector pieces to fill such odd spaces.

The square reflector rods 21 may be directly substituted for the round rods in the reflector can or enclosures shown in the aforementioned co-pending patent appplication. The horizontal support plates of that patent application art may also be used with the stacked square reflector rods of the present invention.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

We claim as our invention:

1. A high solid to void ratio radial neutron reflector for a nuclear reactor, said nuclear reactor comprising a nuclear core positioned within a reactor pressure vessel, said nuclear core comprising an array of fuel assemblies having a square cross-sectional configuration, said fuel assemblies being stacked side by side and having an irregularly shaped outer periphery, a cylindrical core barrel surrounding said nuclear core, a resulting irregularly shaped space between said core periphery and said core barrel, said radial neutron reflector substantially filling said irregularly shaped space and comprising a plurality of enclosures, stacked side by side, each enclosure being fitted with a plurality of side by side stacked clad reflector rods having a substantially square cross-sectional shape with at least one groove in each side thereof extending the length of said rods, said cladding being in substantially abutting contact with the reflector rods therein and being substantially wrinkle free at the flat surfaces thereof and said side-by-side clad reflector rods each being in abutting contact with adjacent clad reflector rods, whereby any interstitial spaces between said abutting side-by-side stacked clad reflector rods are substantially eliminated.

2. The neutron reflector of claim 1, wherein said at least one groove in each side of the reflector rods comprise coolant flow channels for cooling said neutron reflector rods.

3. The neutron reflector of claim 2, wherein said clad neutron reflector rods each comprise an enclosure and one or more blocks of a neutron reflecting material positioned within said enclosure.

4. The neutron reflector of claim 3, wherein said one or more blocks comprises zirconia.

5. The neutron reflector of claim 3, wherein said at least one groove in each side of the reflector rods comprise coinciding grooves in each side of said enclosure and said one or more blocks.

6. The neutron reflector of claim 5, wherein said enclosure comprises a material taken from the group consisting of stainless steel or zirconia.

7. The neutron reflector of claim 5, wherein said enclosure comprises stainless steel having an approximate thickness of 0.051 cm.

* * * * *